United States Patent
Takeuchi

(10) Patent No.: US 8,643,743 B2
(45) Date of Patent: Feb. 4, 2014

(54) IMAGE PROCESSING APPARATUS AND METHOD

(75) Inventor: Yoshitaka Takeuchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/364,116

(22) Filed: Feb. 1, 2012

(65) Prior Publication Data
US 2012/0200732 A1 Aug. 9, 2012

(30) Foreign Application Priority Data

Feb. 3, 2011 (JP) ................................. 2011-022045

(51) Int. Cl.
*H04N 9/73* (2006.01)

(52) U.S. Cl.
USPC .................... 348/223.1; 348/224.1; 348/225.1

(58) Field of Classification Search
USPC ................. 348/223.1, 224.1–225.1
See application file for complete search history.

(56) References Cited

U.S. PATENT DOCUMENTS

| | | | | |
|---|---|---|---|---|
| 5,619,347 | A * | 4/1997 | Taniguchi et al. ............. | 358/516 |
| 6,982,753 | B1 * | 1/2006 | Udagawa .................... | 348/223.1 |
| 7,184,079 | B2 * | 2/2007 | Hoshuyama ................ | 348/223.1 |
| 2001/0045988 | A1 * | 11/2001 | Yamauchi et al. ............ | 348/273 |
| 2002/0054220 | A1 * | 5/2002 | Takeuchi ....................... | 348/223 |
| 2003/0112342 | A1 * | 6/2003 | Takeuchi .................... | 348/223.1 |
| 2004/0017594 | A1 * | 1/2004 | Suekane et al. ............... | 358/516 |
| 2004/0100478 | A1 * | 5/2004 | Bianchi et al. ................ | 345/690 |
| 2004/0120575 | A1 * | 6/2004 | Cheng ........................... | 382/167 |
| 2005/0219391 | A1 * | 10/2005 | Sun et al. ..................... | 348/255 |
| 2008/0219586 | A1 * | 9/2008 | Watanabe et al. ............. | 382/274 |
| 2009/0180002 | A1 * | 7/2009 | Suekane ..................... | 348/223.1 |
| 2009/0225226 | A1 * | 9/2009 | Kakuta ......................... | 348/655 |
| 2010/0208098 | A1 * | 8/2010 | Ogawa ........................ | 348/223.1 |
| 2010/0245618 | A1 * | 9/2010 | Ajito ........................... | 348/223.1 |

FOREIGN PATENT DOCUMENTS

JP 2000-165891 A 6/2000

* cited by examiner

*Primary Examiner* — Nicholas Giles
*Assistant Examiner* — Abdelaaziz Tissire
(74) *Attorney, Agent, or Firm* — Canon U.S.A., Inc., IP Division

(57) ABSTRACT

A first white balance correction amount is calculated according to similarity between image data acquired by an image pickup unit and past image data acquired in the past, and a first white balance correction is performed on the image data according to the first white balance correction amount. A luminance correction amount and a color correction amount are calculated according to similarity between the corrected image data and the past image data corrected in the first white balance correction. Using one of them, the first white balance correction amount is corrected thereby to obtain a second white balance correction amount. According to the obtained correction amount, a second white balance correction, a luminance correction, and a color correction are performed on the image data acquired by the image pickup unit.

7 Claims, 6 Drawing Sheets

PREVIOUS CUT　　　　　　FOLLOWING CUT

IMAGE PROCESSING APPARATUS AND METHOD

BACKGROUND OF THE INVENTION

1. Field of the Invention

The present invention relates to an apparatus and a method for performing image processing on image data acquired by a digital camera or the like.

2. Description of the Related Art

The digital camera has a function of automatically controlling final image quality in terms of white balance, contrast, color, etc. In the automatic white balance adjustment, a color temperature of a light source illuminating an object is estimated from image-taking conditions and image data of the object, and the color of the light source is cancelled to gray such that a resultant adjusted image has natural high quality. In the automatic brightness (contrast) adjustment, the brightness and the tone of the luminance components are automatically adjusted, while in the automatic color adjustment, the saturation and the hue of the color components are automatically adjusted. These adjustments may be performed depending on a scene type (such as a daytime scene, an evening scene, a portrait, etc.) inferred from the image-taking conditions and the taken image data such that the image has brightness and color representation optimized depending on the inferred scene type.

In the automatic adjustment process described above, a slight change in image-taking condition or a slight movement or a change in an object may occur between cuts, and such a change may result in a slight change in detected color temperature or other automatically detected parameters, which may in turn result in a slight change in the automatically adjusted image quality. Even such a slight change may result in incorrect inference about the scene type, which may cause the image processing to be performed according to improper conditions determined from the incorrect scene type. This may result in a difference in image quality between cuts, which may produce an artifact. A method of preventing the above problem is to determine a correlation between cuts by comparing image-taking conditions and the image data between the cuts. If the correlation is high, the inferred scene type is inherited from the previous cut. Note that the term "previous cut" is used in the present description to express a cut of an image taken in the past time. This method makes it possible to minimize the change in image quality between the cuts. Japanese Patent Laid-Open No. 2000-165891 discloses a technique to minimize a change in the white balance.

To determine a correlation between the current cut and the previous cut in common for the white balance adjustment process, the luminance adjustment process, and the color adjustment process, the similarity between the cuts may be determined in common for the three adjustment processes, and the correlation in each process may be judged using the determined similarity. The similarity may be calculated from changes between cuts in terms of aperture value Av, shutter speed Tv, ISO sensitivity, face detection, luminance histogram shape, and color temperature. However, this method of determining the correlation based on the similarity determined in common may cause following problems. For example, in an outdoor scene such as that shown in FIG. 6 in which images of two airplanes are taken as main objects, if the two airplanes are different in color, the correlation based on the similarity is low although two successive cuts are equal in color temperature of a light source and brightness. As a result, conditions in terms of white balance, contrast, and the like are not inherited from the previous cut, and thus a change can occur in white balance and brightness between cuts.

Thus, there is a need for a technique to properly reduce differences between cuts in the white balance adjustment process, the contrast adjustment process, and the color adjustment process.

SUMMARY OF THE INVENTION

According to an aspect, the present invention provides an image processing apparatus including a first calculation unit configured to calculate a first white balance correction amount according to similarity between image data acquired by an image pickup unit and past image data acquired in the past, a first white balance correction unit configured to perform a first white balance correction on the image data acquired by the image pickup unit according to the first white balance correction amount, a second calculation unit configured to calculate a luminance correction amount according to similarity between the image data corrected by the first white balance correction unit and the past image data corrected by the first white balance correction unit, a third calculation unit configured to calculate a color correction amount according to similarity between the image data corrected by the first white balance correction unit and the past image data corrected by the first white balance correction unit, a fourth calculation unit configured to obtain a second white balance correction amount by correcting the first white balance correction amount using at least one of the luminance correction amount and the color correction amount, a second white balance correction unit configured to perform a second white balance correction on the image data acquired by the image pickup unit according to the second white balance correction amount, a luminance correction unit configured to perform a luminance correction on the image data corrected by the second white balance correction unit according to the calculated luminance correction amount, and a color correction unit configured to perform a color correction on the image data corrected by the second white balance correction unit according to the calculated color correction amount.

Further features of the present invention will become apparent from the following description of exemplary embodiments with reference to the attached drawings.

DESCRIPTION OF THE EMBODIMENTS

The present invention is described below with reference to embodiments in conjunction with the accompanying drawings.

First Embodiment

Figure 1:
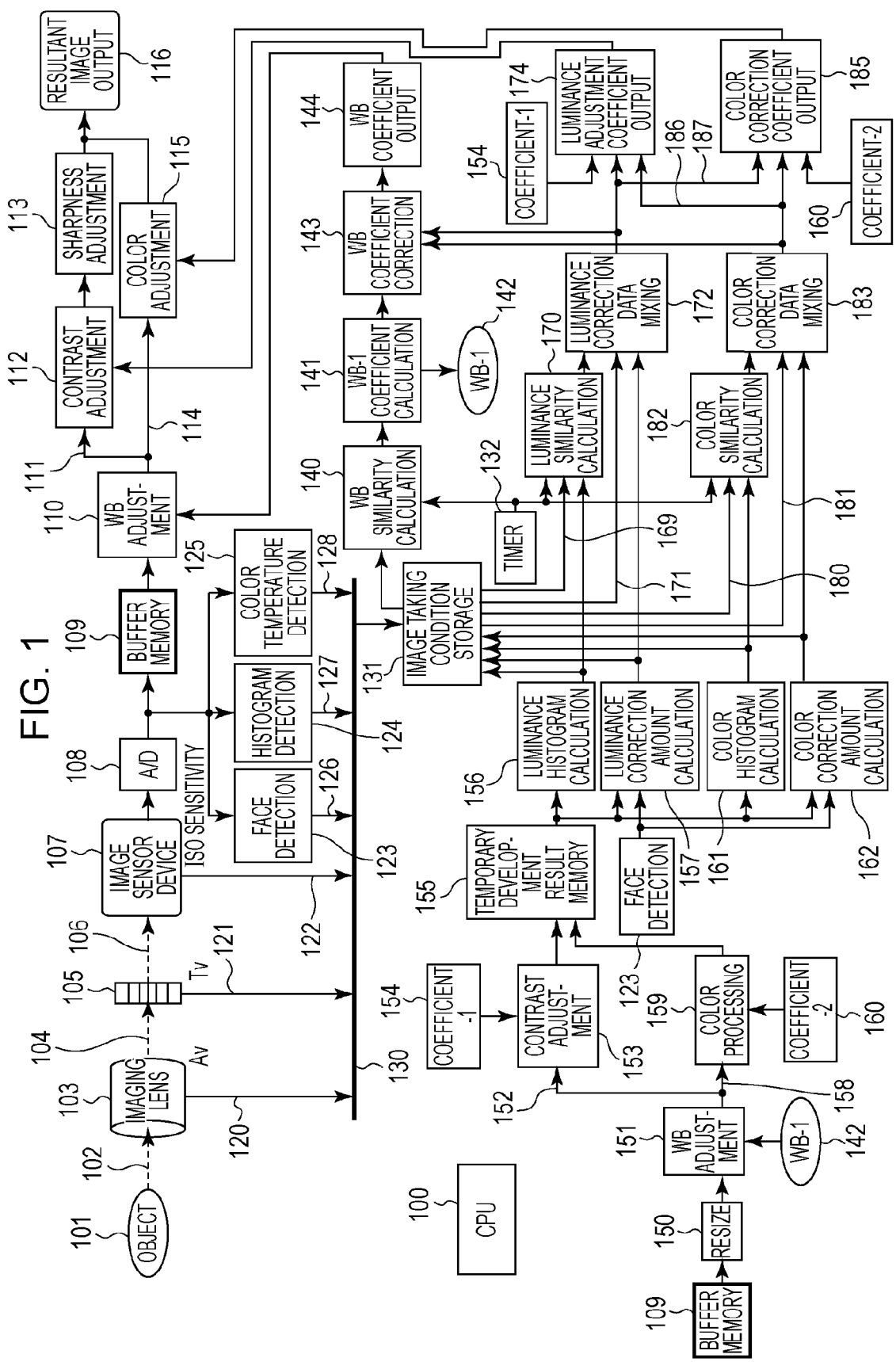
FIG. 1 is a block diagram illustrating a configuration of a digital camera according to an embodiment of the present invention.
Figure 2:
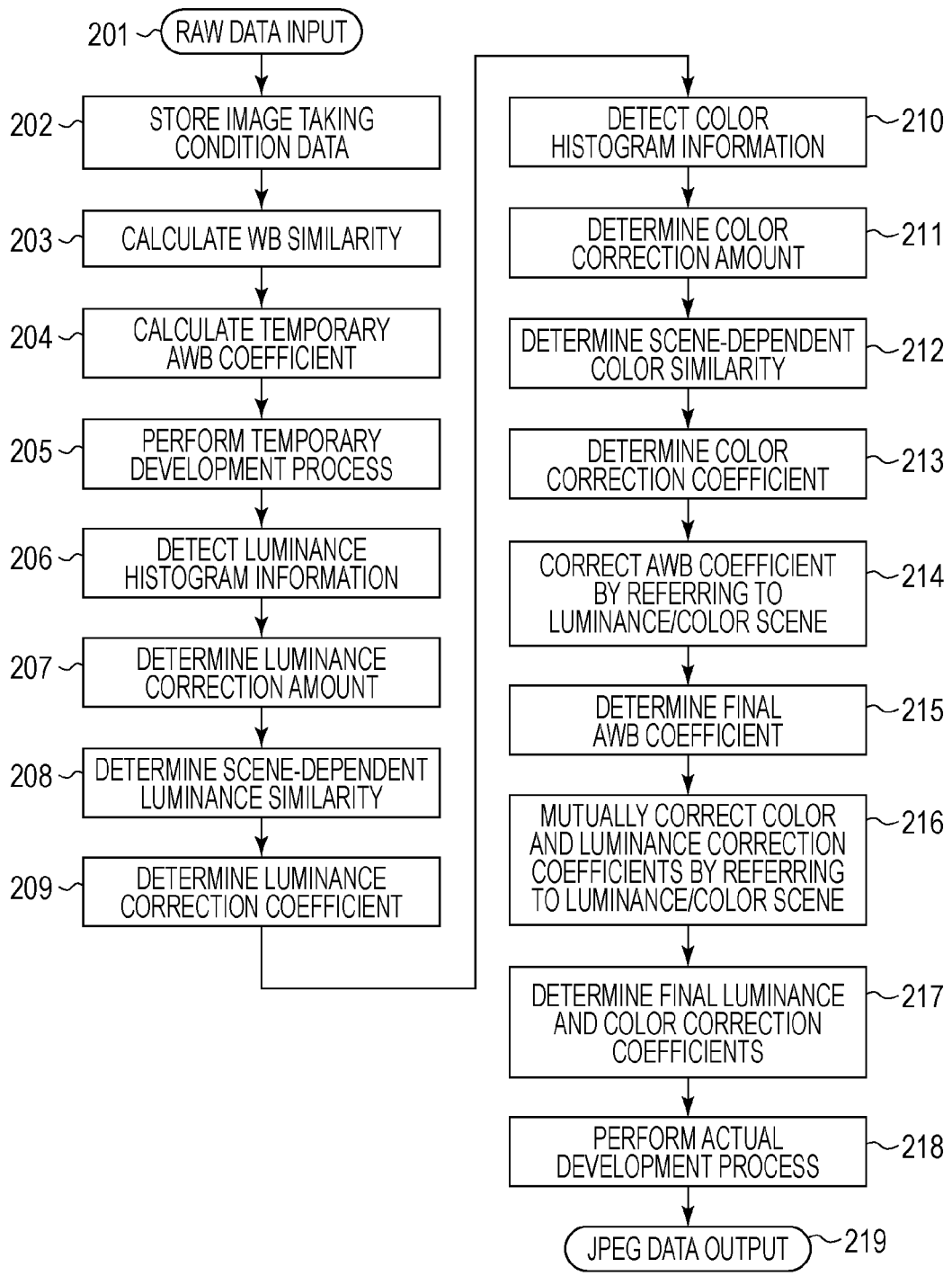
FIG. 2 is a flow chart illustrating a process according to an embodiment of the present invention.

FIG. 1 is a diagram illustrating a process performed in a digital camera according to an embodiment of the present invention. FIG. 2 is a flow chart illustrating image processing according to the present embodiment. Referring to FIG. 1 and FIG. 2, the present embodiment is described below.

In FIG. 1, reference numeral 101 denotes an object whose image is taken, and reference numeral 102 denotes an optical image of the object 101. An imaging lens 103 having an aperture outputs an optical image 104. An aperture value Av (120) employed, which is one of image-taking conditions, is output from the imaging lens 103. A shutter 105 is a mechanical shutter that operates at a shutter speed Tv, and an optical image 106 is output through the shutter 105. The shutter speed Tv employed, which is one of the image-taking conditions, is output from the shutter 105. An image sensor 107 converts the optical image 106 into an electric image signal and outputs the resultant electric image signal. In the outputting of the image signal, the image sensor 107 multiplies the produced image signal by a gain value corresponding to a specified ISO sensitivity. The ISO sensitivity employed, which is one of the image-taking conditions, is output from the image sensor 107. An A/D (analog-to-digital) converter 108 converts the image signal output from the image sensor 107 into a digital signal. The resultant digital signal is output as raw data, which is a digital image signal that has not yet been subjected to a development process.

A buffer memory 109 temporarily stores raw data output from the A/D converter 108. The buffer memory 109 has a storage capacity that allows one or more cuts of image data. A White Balance (WB) adjustment unit 110 develops the raw data output from the buffer memory 109. In the development, the white balance is adjusted according to set white balance adjustment values (coefficients). More specifically, R, G, and B color signals (hereinafter referred to as RGB signals) are multiplied by gain values corresponding to the adjustment values.

A contrast adjustment unit 112 adjusts the contrast of a luminance signal 111 produced based on the RGB signals output from the WB adjustment unit 110. A sharpness adjustment unit 113 adjusts the sharpness of the luminance signal output from the contrast adjustment unit 112. A color adjustment unit 115 performs a color adjustment process on color signals 114 produced based on the RGB signals output from the WB adjustment unit 110. A resultant image output 116 is a final image produced from the luminance signal output from the sharpness adjustment unit 113 and the color signals output from the color adjustment unit 115.

A face detection unit 123 detects a face in the image produced by developing the raw data. More specifically, the face detection unit 123 detects a face by performing a matching process using face templates stored in the face detection unit 123. Face data 126 indicating the number of detected faces, the coordinates of the center of each face, the size of each face, the confidence level of the detection, and the like is output from the face detection unit 123. A histogram generation unit 124 generates a histogram of luminance from the raw data and outputs histogram data 127 indicating the generated histogram. The histogram data includes at least frequency data, the number of peaks and valleys in the histogram, positions thereof on a luminance axis (i.e., luminance values) as in the example shown in FIG. 4A. A color temperature detection unit 125 calculates the sum of color values of respective mesh blocks with a predetermined size defined in the raw data of a cut, taking into the account of a white extraction range based on a black body radiation axis. The color temperature detection unit 125 detects a color temperature of the cut of the image from the calculated sum of color values and outputs color temperature data 128 indicating the result.

An image taking condition storage unit 131 stores data used or produced by respective processing blocks in connection with the raw data of each cut. The image taking condition storage unit 131 is configured to store the data of at least two or more cuts. A bus 130 is provided for transferring data between the image taking condition storage unit 131 and the processing blocks.

Blocks 132 to 187 determine final parameters used in processing performed by the image processing blocks 110 to 115 based on the raw data stored in the buffer memory 109 and the data stored in the image taking condition storage unit 131. Details of these blocks 132 to 187 will be described later. A central processing unit (CPU) 110 generally controls the operation and the processing performed in the digital camera. Note that the signal processing blocks described above may be implemented by dedicated hardware or may be implemented by software executed by the CPU 100.

The processing is described in further detail with reference to a flow chart shown in FIG. 2. If an image take command is issued, then, first, in step S201, the CPU 100 controls processing blocks to perform an image taking operation. In the image taking operation, raw data output from the A/D converter 108 is temporarily stored in the buffer memory 109.

In step S202, the CPU 100 stores, in the image taking condition storage unit 131, image-taking conditions under which the raw data was produced. The image-taking conditions include an aperture value Av 120 of the imaging lens 103, a shutter speed Tv 121 of the shutter 105, and an ISO sensitivity 122 of the image sensor. Similarly, face data 126 detected by the face detection unit 123 from the raw data, histogram data 127 produced by the histogram generation unit 124, and color temperature data 128 detected by the color temperature detection unit 125 are stored. Furthermore, a time at which the raw data is captured is measured by the timer 132 and store. The image-taking conditions, the image taking time, and the detection data are stored as image taking condition data associated with the current cut in the image taking condition storage unit 131.

In step S203, the WB similarity calculation unit 140 refers to the image taking condition data of past shots stored in the image taking condition storage unit 131. In the present embodiment, as the image taking condition data of the past cut, data of an immediately previous cut is referred to, and the similarity between the current cut and the past cut is calculated. More specifically, first, the WB similarity calculation unit 140 calculates the similarity used in the white balance adjustment process.

The WB similarity calculation unit 140 calculates the difference in each image-taking condition (Av, Tv, and ISO) included in the image taking condition data and checks whether the difference in each image-taking condition is less than a threshold value defined for each image-taking condition to determine whether the current cut is similar to the previous cut. The result is given as either 100% or 0%, and the data indicating the result is output.

In terms of the face information, estimation values are determined in terms of the number of faces and the positions thereof according to predetermined threshold values. More specifically, in a case where a face is detected in both the current cut and the previous, and the difference in potion thereof is less than a threshold value, the similarity is determined as 100% but otherwise the similarity is determined as 0%.

In terms of the color temperature, if the difference from the previous cut is equal to or less than 100K, the similarity is determined as 100%. When the difference is equal to or larger than 400K, the similarity is determined as 0%. For values between 100K and 400K, the similarity is determined by linear interpolation. For example, when the difference is equal to 130K, the similarity is determined as 90%. However, the color temperature is a non-linear value of chromaticity. Therefore, xy chromaticity may be converted to a value in a chromaticity coordinate system, and the similarity may be determined based on a difference in this coordinate system.

In terms of the elapsed time, the similarity is determined under the assumption that the image-taking conditions change with elapsed time. For example, when the elapsed time is equal to or less than 1 second, the similarity is regarded as 100%, while the elapsed time is equal to or greater than 30 seconds, the similarity is regarded as 0%. For values of the elapsed time from 1 second to 30 seconds, a WB-1 coefficient calculation unit 141 determines the similarity by linear interpolation.

The white balance has a direct correlation with the color temperature. Therefore, the WB similarity calculation unit 140 gives a greatest weight to the color temperature in the determination of the similarity. For example, when the similarity of the color temperature is equal to or greater than 70%, the final similarity is set to be 70% regardless of the result of the similarity calculation based on Av, Tv, ISO, the face, and the elapsed time. When the similarity of the color temperature is less than 70%, if the similarity determined based on the Av, Tv, ISO, and the face information is equal to 100%, then the final similarity is given by the product of the similarity of the color temperature and the similarity based on the elapsed time.

In step S204, depending on the similarity determined in the above-described manner by the WB similarity calculation unit 140, the WB-1 coefficient calculation unit 141 adds the white balance coefficients of the past cut to the white balance coefficients determined from the image data of the current cut.

For example, when the similarity is 70%, R, G, and B components of the white balance coefficients of the past cut are multiplied by 0.3, while R, G, and B components of the white balance coefficients of the image data of the present cut are multiplied by 0.7, and they are added together individually for each of the R, G, and B components.

The WB-1 coefficient calculation unit 141 employs the white balance coefficients determined in the above-described manner as temporary white balance coefficients WB-1 (142) (first white balance correction amount) used in temporary processing on the captured image data.

Next, in step S205, a resizing unit 150 reads raw data of the image of the current cut from the buffer memory 109 and resizes it to reduce the total number of pixels so that processing can be performed in a shorter time. A WB adjustment unit 151 (first calculation unit) performs a white balance adjustment process on the resized image data using the temporary white balance coefficients WB-1 (142). The image data subjected to the white balance adjustment process using the temporary white balance coefficients WB-1 is separated into a luminance signal (152) and color signals (158). The contrast adjustment unit 152 and the color adjustment unit 159 respectively perform a contrast adjustment process and a color adjustment process using a standard contrast correction parameter coefficient-1 (154) and a standard color adjustment parameter coefficient-2 (160) prepared in advance. The resultant image data is temporarily stored in a temporary development result memory 155.

In step S206, a luminance histogram calculation unit 156 calculates a histogram of the luminance Y using the signal stored in the temporary development result memory 155 and detects luminance histogram information from a shape of the histogram. The luminance histogram information includes at least the number of peaks of the histogram, the number of valleys of the histogram, and the positions (luminance values) of the peaks and the valleys on a luminance axis.

Figure 3A:
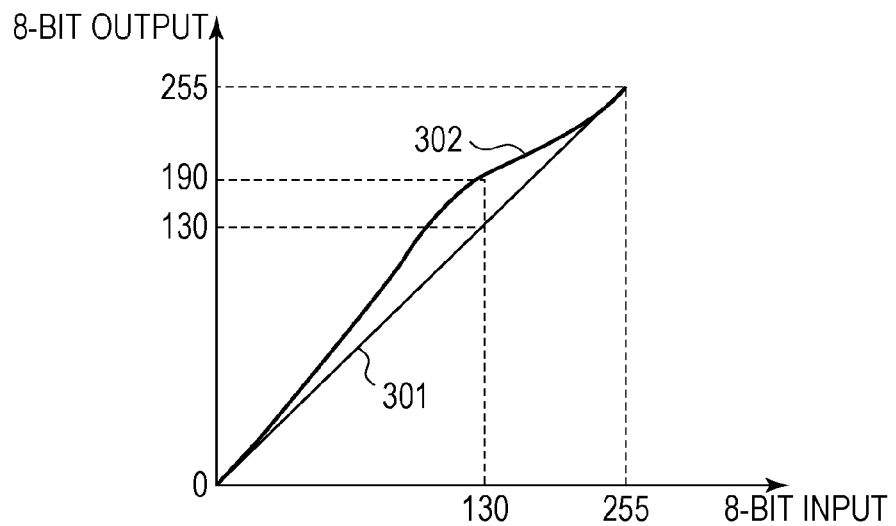
FIGS. 3A and 3B are diagrams illustrating a manner of correcting luminance.

In step S207, a luminance correction amount calculation unit 157 calculates an automatic correction amount of the luminance (brightness) for the image data stored in the temporary development result memory 155 using the face information output from the face detection unit 123. For example, let it be assumed, as shown in FIG. 3A, that on a linear 8-bit input-output characteristic curve 301 given as a reference curve, a value of 130 is obtained as the average luminance of data corresponding to a face area (identified based on the face position and the face size) of the luminance data stored in the temporary development result memory 155. In this situation, if the predetermined target value of the luminance of the face is 190, then one point is determined such that the input value of 130 is converted into the target value of 190 at this one point, and a tone correction table is produced using linear interpolation between this point and end points of the range of the luminance. Using this tone correction table, a gain correction amount used in the contrast correction is prepared. The determined luminance histogram information and luminance correction amount are stored as the image taking condition information associated with the image of the current cut in the image taking condition storage unit 131 together with the image taking condition data described above.

Next, in step S208, a luminance similarity calculation unit 170 calculates the similarity of the luminance signal component Y of the temporarily developed image data. More specifically, a comparison is made between the luminance histogram information obtained from the temporary development result and the luminance histogram information 169 of the previous cut read from the image taking condition storage unit 131.

Figure 4A:
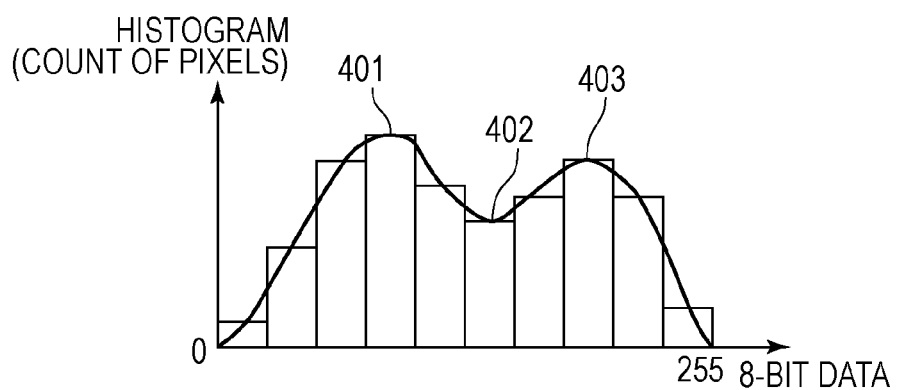
FIGS. 4A and 4B are diagrams illustrating a manner of determining similarity using a histogram.
Figure 4B:
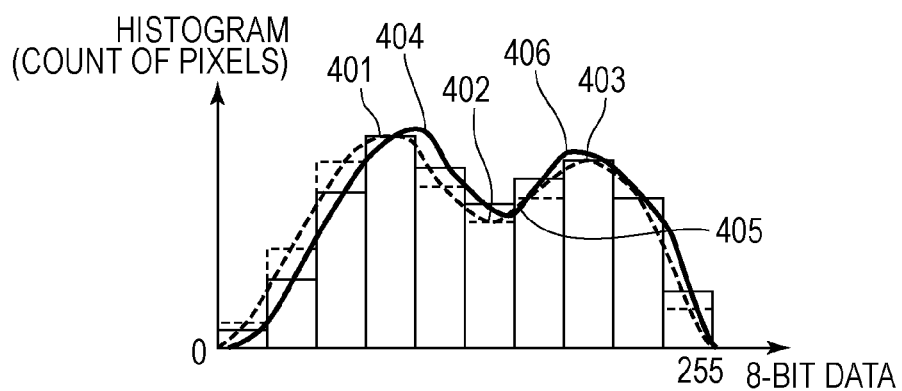

As shown in FIG. 4A, in the present embodiment, the luminance histogram is produced simply by dividing the allowable total range of the luminance value into ten intervals and integrating the luminance value over each interval. In the example shown in FIG. 4A, a first peak occurs at a fourth interval as measured from the left, a first valley course at a sixth interval, and a second peak occurs at an eighth interval. In the comparison, as shown in FIG. 4B, the similarity is determined by checking whether the sum of differences in peak position and valley position (401 to 406) between the current shape (dashed line) and the past shape (solid line) is less than a threshold value or the sum of differences in count values of respective intervals between the current and past shapes is less than a threshold value. The similarity is determined based on not only the histogram information but also the elapsed time since the previous cut was taken, the difference in Av value, the difference in Tv value, the difference in ISO value, and the like.

In step S209, according to the similarity calculated by the luminance similarity calculation unit 170, a luminance correction amount mixing unit 172 (second calculation unit) mixes the luminance correction amount determined from the temporary development result of the current cut and the luminance correction amount 171 determined from the temporary development result of the previous cut.

Figure 3B:
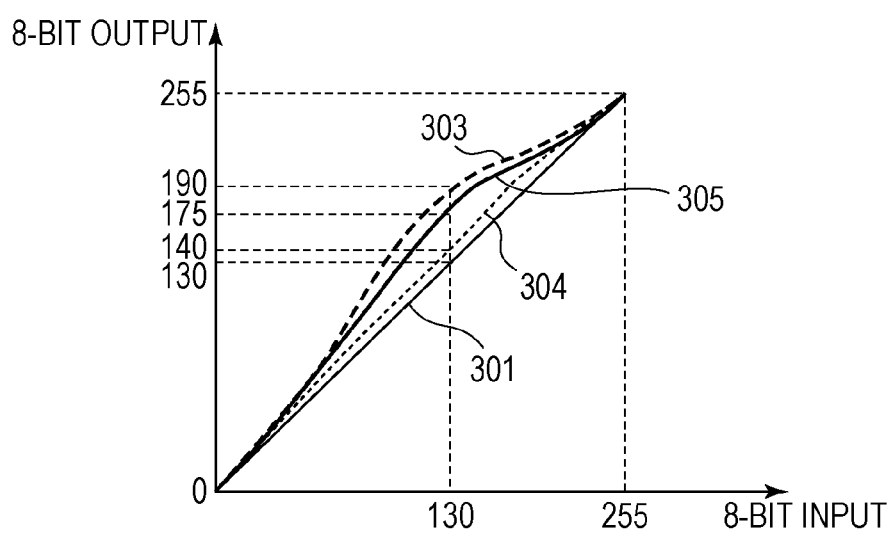

Let it be assumed that the brightness of the face of the current cut is different from that of the previous cut as with the case of the correction amount 304 shown in FIG. 3B. Although not shown in the figure, the luminance of the face of the previous cut was increased to 180 as a result of the correction, and the application of the correction curve 304 causes the luminance of 180 to be increased to a target value of 190.

In this case, if the similarity is equal to 70%, then the correction amount 303 of the previous cut and the correction amount 304 of the current cut are mixed with a ratio of 7 to 3, whereby a final luminance correction amount 305 is obtained. For example, for an input value of 130, the correction value of the previous cut is 190 and the correction value of the current cut is 140, and thus the mixed correction amount is given as 175. The determined luminance correction amount is sent to the luminance adjustment coefficient output unit 174 to mix the correction amounts such that the above-described luminance correction amount is added to the default parameter coefficient-1 (154).

Processing is performed in a similar manner on the color signals, as described below. In step S210, color signal components of the image data of the current cut obtained from the temporary development result are processed by a color histogram calculation unit 161 to determine color ratios R/G and B/G as the averages taken over the entire screen area.

Figure 5A:
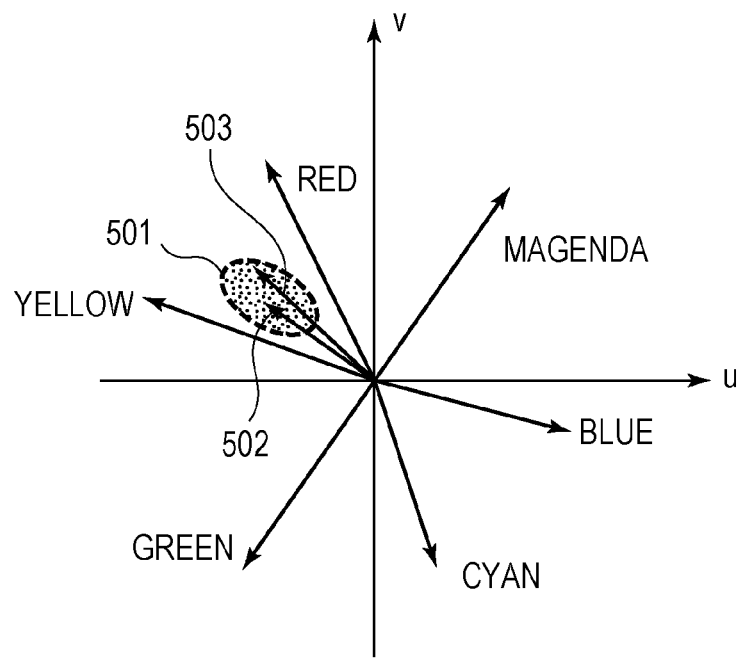
FIGS. 5A and 5B are diagrams illustrating a manner of correcting colors.

In the color correction, as shown in FIG. 5A, color signals are first converted from the RGB signals of the temporary development result into uv signals, and Skin (502) is determined which indicates the average values of the color signals (distribution 501) in the detected face area. The correction is then performed such that the uv signals of the average values Skin (502) are converted to predetermined target values (503) of the face color. If let (u, v) denotes the uv signal values of the average values Skin (502) and (u', v') denote the uv signal values of the target values of the face color, then correction values are determined such that following equations (1) and (2) are satisfied in terms of hue and saturation.

$$\begin{pmatrix} u' \\ v' \end{pmatrix} = \begin{pmatrix} a & b \\ c & d \end{pmatrix} \begin{pmatrix} u \\ v \end{pmatrix} \quad (1)$$

$$\begin{pmatrix} u' \\ v' \end{pmatrix} = \begin{pmatrix} m & 0 \\ 0 & n \end{pmatrix} \begin{pmatrix} u \\ v \end{pmatrix} \quad (2)$$

where a, b, c, d, m, and n are correction values. Note that in the uv signal diagram shown in FIG. 5A, the correction values are given by a vector extending from the point of vector of Skin (502) to the point of the vector of the target values (503).

In step S212, a color similarity calculation unit 182 compares color ratio information output from the color histogram calculation unit 161 with a color ratio signal 180 of the previous cut read from the image taking condition storage unit 131. In this comparison process, a determination is made as to whether the differences in color ratios R/G and B/G are less than threshold values, and the similarity is determined according to the result. The similarity determination by the color similarity calculation unit 182 is based on not only the color ratio information but also the elapsed time since the previous cut was taken, the difference in Av value, the difference in Tv value, the difference in ISO value, and the like.

In step S213, according to the similarity calculated by the color similarity calculation unit 182, a color correction amount mixing unit 183 (third calculation unit) mixes the color correction amount determined from the temporary development result of the current cut and color correction amount 181 determined from the temporary development result of the previous cut.

Figure 5B:
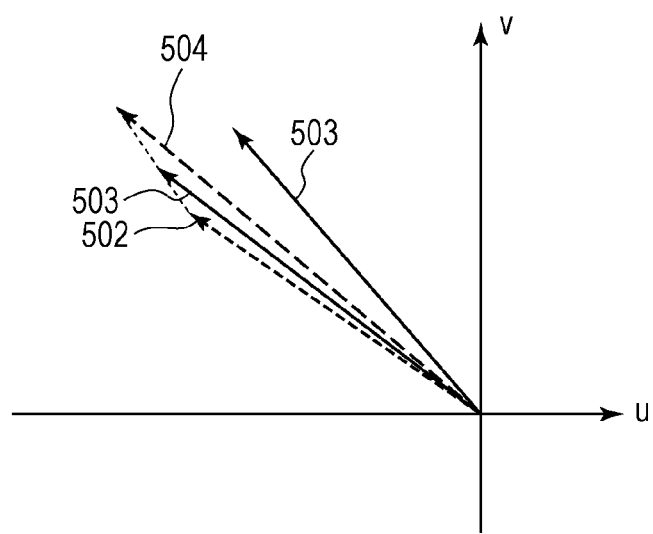
Figure 6:
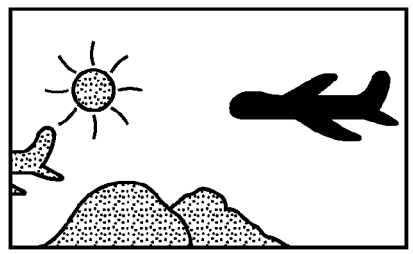
FIG. 6 is a diagram illustrating scenes in which luminance and colors change while color temperature remains constant.
Figure 6:
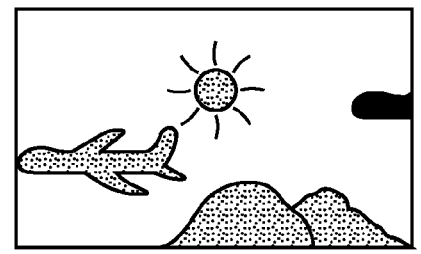

When the correction amount of the face color for the current cut is different from that for the previous cut, if the similarity is, for example, 50%, then parameters a, b, c, and d in the hue correction (equation 1) and m and n in the saturation correction (equation 2) are determined by performing linear interpolation with a ratio of 1 to 1 between the correction amounts for the previous cut and the correction amounts for the current cut. This determination process in a coordinate system is illustrated in FIG. 5B. When a vector 502 is obtained as a result of mixing together the Skin (504) representing the average values of the current cut and the Skin (502) representing the average values of the previous cut with a ratio of 1 to 1, correction amounts are given by a vector extending from the point of the vector 502 to the point of the vector representing the target values (503).

The calculation of the correction amounts has been explained above, by way of example, for the face area obtained by the face detection process. Note that the above method may be employed not only for the face area but other areas. For example, when a particular upper area of an image frame is defined as a setting sun area, correction amounts may be determined in a similar manner based on the hue and the saturation in this area. The method may also be employed for determining correction amounts in a blue sky area.

The determined color signal correction amounts a, b, c, d, m, and n are output from the color correction amount mixing unit 183 to the color adjustment coefficient output unit 185, and the correction amounts are added to the default parameter coefficient-2 (160).

In step S214, using the determined luminance correction amount and color correction amount, a WB coefficient correction unit 143 (fourth calculation unit) further corrects the white balance coefficients WB-1 used in the development process. For example, in a case where the scene is a setting sun scene and the color correction amount is determined to enhance the setting sun image, the orange color of the setting sun may be further enhanced to a level greater than the level obtained by the above color correction amount by shifting the white balance coefficients in a direction toward a higher color temperature such that the final image quality becomes more reddish. In step S215, a WB coefficient output unit 144 determines the final WB coefficients (second white balance correction amount) and outputs them.

In step S216, the color correction amount and the luminance correction amount are mutually corrected using the luminance correction amount and the color correction amount determined in the previous steps. For example, when the luminance correction amount is great, the color correction amount obtained in step S213 is increased with increasing luminance correction amount obtained in step S209 so that the saturation of the color signals does not become too low and so that the color does not become faint over the whole image area.

In step S217, a luminance adjustment coefficient output unit 174 and a color adjustment coefficient output unit 185 respectively output the luminance adjustment (contrast adjustment) coefficients and the color adjustment coefficients determined in the previous steps to the contrast adjustment unit 112 and a color adjustment unit 115, respectively.

In step S218, the WB adjustment unit 110, the contrast adjustment unit 112, and the color adjustment unit 115 perform image processing. Furthermore, a sharpness adjustment unit 113 performs a sharpness adjustment process on the luminance signal. In step S219, the resultant image data is finally output from an output 116. The final image data may be compressed in the JPEG form or the like as required.

According to the present embodiment, as described above, the similarity in auto white balance between the current cut and the previous cut is measured, and the optimum white balance correction value is determined according to the similarity. Thereafter, the temporary development process is performed to determine the correction amounts for the luminance signal and the color signal and the similarity of the correction amounts between the current cut and the previous cut is determined. The final correction amounts in terms of the luminance signal and the color signals are determined according to the similarity. This makes it possible to minimize the difference in automatic image correction process between cuts.

Other Embodiments

While the present invention has been described with reference to exemplary embodiments, the invention is not limited to the disclosed exemplary embodiments, and many modifications and changes are possible within the spirit and the scope of the invention.

For example, in the embodiments described above, the automatic adjustment is performed for the following three items, the white balance, the luminance, and the color. However, the items subjected to the automatic adjustment are not limited to these three. For example, the automatic adjustment may be performed on two items, such as the white balance and the luminance, or the white balance and the color, or the like.

In the embodiments described above, it is assumed by way of example that the image correction process is performed in the digital camera. However, the embodiments may be applied to an image correction processes performed in other devices such as an image playback apparatus if devices have a capability of dealing with image taking condition information, corresponding to the information stored in the image taking condition storage unit 131, described in a header of a raw data file. Examples of image playback apparatuses include a personal computer in which application software is installed to implement the function of performing the process shown in FIG. 2, and a display device having the function of performing the process shown in FIG. 2, etc.

Aspects of the present invention can also be realized by a computer of a system or apparatus (or devices such as a CPU or microprocessor unit (MPU)) that reads out and executes a program of computer executable instructions recorded on a memory device to perform the functions of the above-described embodiment(s), and by a method, the steps of which are performed by the computer of the system or apparatus by, for example, reading out and executing the program recorded on the memory device to perform the functions of one or more of the above-described embodiments of the present invention. For this purpose, the program can be provided to the computer for example via a network or from a recording medium of various types serving as the memory device (e.g., computer-readable medium). The computer-readable medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-022045, filed Feb. 3, 2011, which is hereby incorporated by reference herein in its entirety.

What is claimed is:

1. An image processing apparatus comprising:
a first calculation unit configured to calculate a first white balance correction amount according to similarity between image data acquired by an image pickup unit and past image data acquired in the past;
a first white balance correction unit configured to perform a first white balance correction on the image data acquired by the image pickup unit according to the first white balance correction amount;
a second calculation unit configured to calculate a luminance correction amount according to similarity between the image data corrected by the first white balance correction unit and the past image data corrected by the first white balance correction unit;
a third calculation unit configured to calculate a color correction amount according to similarity between the image data corrected by the first white balance correction unit and the past image data corrected by the first white balance correction unit;
a fourth calculation unit configured to obtain a second white balance correction amount by correcting the first white balance correction amount using at least one of the luminance correction amount and the color correction amount;
a second white balance correction unit configured to perform a second white balance correction on the image data acquired by the image pickup unit according to the second white balance correction amount;
a luminance correction unit configured to perform a luminance correction on the image data corrected by the second white balance correction unit according to the calculated luminance correction amount; and
a color correction unit configured to perform a color correction on the image data corrected by the second white balance correction unit according to the calculated color correction amount.

2. The image processing apparatus according to claim 1, further comprising a storage unit configured to store image taking condition information associated with each shot of image data acquired by the image pickup unit,
wherein the similarity used by the first calculation unit, the second calculation unit, and the third calculation unit is determined using the image taking condition information stored in the storage unit.

3. The image processing apparatus according to claim 2, wherein the image taking condition information includes an image taking condition employed in taking an image by the image pickup unit and detection data from the image data.

4. The image processing apparatus according to claim 1, wherein the first calculation unit determines the first white balance correction amount by a weighted addition operation wherein a weight for the white balance correction amount for the image data acquired in the past is increased as the similarity increases.

5. The image processing apparatus according to claim 1, wherein the second calculation unit calculates the luminance correction amount by a weighted addition operation wherein as the similarity increases between the image data corrected by the first white balance correction unit and the image data of a previous cut corrected by the first white balance correction unit, the weight is increased for the luminance correction amount on the image data of the previous cut corrected by the first white balance correction unit.

6. The image processing apparatus according to claim 1, wherein the third calculation unit calculates the color correction amount by a weighted addition operation wherein as the similarity increases between the image data corrected by the first white balance correction unit and the image data of a previous cut corrected by the first white balance correction unit, the weight is increased for the luminance correction amount on the image data of the previous cut corrected by the first white balance correction unit.

7. An image processing method, comprising:
- performing a first calculation of a first white balance correction amount according to similarity between image data acquired by an image pickup unit and past image data acquired in the past;
- performing a first white balance correction on the image data acquired by the image pickup unit according to the first white balance correction amount;
- performing a second calculation of a luminance correction amount according to similarity between the image data corrected in the first white balance correction and the past image data corrected in the first white balance correction;
- performing a third calculation of a color correction amount according to similarity between the image data corrected in the first white balance correction and the past image data corrected in the first white balance correction;
- performing a fourth calculation to obtain a second white balance correction amount by correcting the first white balance correction amount using at least one of the luminance correction amount and the color correction amount;
- performing a second white balance correction on the image data acquired by the image pickup unit according to the second white balance correction amount;
- performing a luminance correction on the image data corrected in the second white balance correction according to the calculated luminance correction amount; and
- performing a color correction on the image data corrected in the second white balance correction according to the calculated color correction amount.

* * * * *